United States Patent
Aoki et al.

(10) Patent No.: US 6,960,309 B2
(45) Date of Patent: Nov. 1, 2005

(54) PLASMA DISPLAY APPARATUS, FLUORESCENT MATERIAL, AND FLUORESCENT MATERIAL MANUFACTURING METHOD

(75) Inventors: Masaki Aoki, Osaka (JP); Hiroyuki Kawamura, Osaka (JP); Kazuhiko Sugimoto, Kyoto (JP); Mitsuhiro Otani, Osaka (JP); Junichi Hibino, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/432,334
(22) PCT Filed: Sep. 11, 2002
(86) PCT No.: PCT/JP02/09262
§ 371 (c)(1),
(2), (4) Date: Oct. 14, 2003
(87) PCT Pub. No.: WO03/025089
PCT Pub. Date: Mar. 27, 2003

(65) Prior Publication Data
US 2004/0066354 A1 Apr. 8, 2004

(30) Foreign Application Priority Data
Sep. 12, 2001 (JP) .................................. 2001-276301

(51) Int. Cl.[7] .............................................. H01F 17/16
(52) U.S. Cl. ........................ 252/301.4 R; 252/301.4 F; 313/86; 313/582; 313/584
(58) Field of Search ................... 313/486, 582, 313/584; 252/301.4 R, 301.4 F (56) References Cited

U.S. PATENT DOCUMENTS 4,353,808 A 10/1982 Tanimizu et al.
5,385,631 A 1/1995 Tamemasa et al.
6,187,225 B1 2/2001 Rao
6,736,995 B2 * 5/2004 Juestel et al. ......... 252/301.4 R

FOREIGN PATENT DOCUMENTS

| JP | 2000-34478 | 2/2000 |
| JP | 2001-55567 | 2/2001 |
| JP | 2001-89759 | 4/2001 |

OTHER PUBLICATIONS

Ohmsha, "Phosphor Handbook", pp. 219–229.
Kijima Naoto et al., "Crystal Structure and Degradation Mechanism of Blue Phosphor", Display and Imaging, 1999, vol. 7, pp. 225–234.
Oyo Butsuri, "Improvement of reliability of PDP blue phosphor", Applied Physics, 2001, vol. 70, No. 3, p. 310.
M. Shiiki et al., "Thermal degradation of PDP phosphors", Electronic Information and Communication Institute, Technical Research Report, EID99-94, Jan. 27, 2000, pp. 117–122.
Kenji Saito et al., "PDP Session 6: Plasma Displays Paper 6.1: Invited Paper: Phosphors for Plasma Display Panels: Demands and Achieved Performance", The Institute of Image Information and Television Engineers, IDY 2000, 317, p. 32.

* cited by examiner

*Primary Examiner*—C. Melissa Koslow
(74) *Attorney, Agent, or Firm*—McDermott Will & Emery LLP (57) ABSTRACT

The present invention inhibits water adsorption onto the surface of a blue phosphor, decreases luminance degradation and chromaticity shift of a phosphor, or improves discharge characteristics thereof. The blue phosphor is a compound represented by $Ba_{1-x}MgAl_{10}O_{17}:Eu_x$ or $Ba_{1-x-y}Sr_yMgAl_{10}O_{17}:Eu_x$, wherein $0.03 \leq x \leq 0.25$ and $0.1 \leq y \leq 0.5$, and containing at least one of Ti, Zr, Hf, Si, Ge, Sn, and Ce substituting for part of one of elements Al and Mg.

9 Claims, 4 Drawing Sheets

PLASMA DISPLAY APPARATUS, FLUORESCENT MATERIAL, AND FLUORESCENT MATERIAL MANUFACTURING METHOD

TECHNICAL FIELD

The present invention relates to a plasma display apparatus(device) used for image display on a television or other equipment. It also relates to a phosphor for use in the plasma display device, and a method of fabricating the phosphor(fluorescent material).

BACKGROUND ART

Among color display devices used for image display on a computer or television, a display device using a plasma display panel (hereinafter referred to as a "PDP") has recently been drawing attention, as a large, thin, and light color display device.

A plasma display device using a PDP performs additive color mixing of so-called three primary colors (red, green, and blue) to provide full-color display. For this full-color display, a plasma display device has phosphor layers for emitting the respective three primary colors, i.e. red (R), green (G), and blue (B). Phosphor particles constituting these phosphor layers are exited by ultraviolet light generated in discharge cells of the PDP to generate visible light of respective colors.

Known as compounds used for the phosphors of above respective colors are $(YGd)BO_3:Eu^{3+}$ and $Y_2O_3:Eu^{+3}$ for red emission, $Zn_2SiO_4:Mn^{+2}$ for green emission, and $BaMgAl_{10}O_{17}:Eu^{+2}$ for blue emission. Each of these phosphors is fabricated by mixing specific materials and firing the mixture at high temperatures of at least 1,000° C. for solid-phase reaction (see "Phosphor Handbook" p.219 and 225, Ohmsha, for example). The phosphor particles obtained by this firing are used after they are milled and classified (average diameter of red and green particles: 2 to 5 $\mu$m, average diameter of blue particles: 3 to 10 $\mu$m).

The phosphor particles are milled and classified for the following reason. In general, when phosphor layers are formed on a PDP, a technique of screen-printing a paste of phosphor particles of each color is used. In application of the paste, the smaller and more uniform diameters of phosphor particles (i.e. a uniform particle size distribution) can easily provide the smoother coated surface.

In other words, when phosphor particles have smaller and more uniform diameters and shapes approximating to a sphere, the coated surface is smoother. The smoother coated surface increases the packing density of the phosphor particles in a phosphor layer and the emission surface area of the particles, thus alleviating unstableness at address drive. As a result, it is theoretically considered that the luminance of the plasma display device can be increased.

However, the smaller diameters of phosphor particles increase the surface area of the phosphor and defects on the surface of the phosphor. For this reason, a large quantity of water, carbonic acid gas, or organic substances including hydrocarbon are likely to adhere to the surface of the phosphor. Especially for a blue phosphor made of $Ba_{1-x}MgAl_{10}O_{17}:Eu_x$, or $Ba_{1-x-y}Sr_yMgAl_{10}O_{17}:Eu_x$, these crystal structures have layer structures (see "Display and Imaging", 1999, vol. 7, pp 225–234, for example). In the layers, there is oxygen (O) vacancy in the vicinity of a layers containing Ba atoms (Ba—O layers) (see OYO BUTSURI (Applied Physics), vol. 70, No.3, 2001, pp 310, for example).

For this reason, water existing in air is selectively adsorbed onto the surface of the Ba—O layer of the phosphor. Therefore, because a large quantity of water is released into a panel in a panel manufacturing process, the water reacts with the phosphor and MgO during discharge. This poses problems of luminance degradation and chromaticity shift (color shift or image burn caused by the chromaticity shift), or decrease in drive voltage margin and increase in discharge voltage. A conventionally devised method to address these problems is coating the entire surface of the phosphor with a crystal of $Al_2O_3$, in order to recover the defects in the vicinity of the Ba—O layer (see Japanese Patent Unexamined Publication No. 2001-55567, for example).

However, this method poses another problem: coating the entire surface causes absorption of ultraviolet light and thus decreases the emission luminance of the phosphor, and the ultraviolet light decreases the luminance.

DISCLOSURE OF THE INVENTION

In order to address these problems, the present invention aims to inhibit water adsorption onto the surface of a blue phosphor, decrease luminance degradation and chromaticity shift of a phosphor, or improve discharge characteristics thereof. Especially in the present invention, elimination of oxygen vacancy in the vicinity of a layers containing Ba atoms (Ba—O layers) in a blue phosphor inhibits water adsorption onto the surface of the blue phosphor, decreases luminance degradation and chromaticity shift of a phosphor, or improves discharge characteristics thereof.

In order to accomplish these purposes, a plasma display device of the present invention has a plasma display panel in which a plurality of discharge cells of one or a plurality of colors are disposed in arrays, phosphor layers having a color corresponding to the respective discharge cells are disposed, and the phosphor layers are excited by ultraviolet light to emit light. The phosphor layers have a blue phosphor. The blue phosphor is made of a compound represented by $Ba_{1-x}MgAl_{10}O_{17}:Eu_x$ or $Ba_{1-x-y}Sr_yMgAl_{10}O_{17}:Eu_x$ in which at least one kind of the elements Ti, Zr, Hf, Si, Ge, Sn and Ce substitutes for part of the element Al or Mg.

A phosphor of the present invention is a blue phosphor having a crystal structure of $Ba_{1-x}MgAl_{10}O_{17}:Eu_x$ or $Ba_{1-x-y}Sr_yMgAl_{10}O_{17}:Eu_x$ that is exited by ultraviolet light to emit visible light. In the blue phosphor, a quadrivalent element substitutes for the element Al or Mg that constitutes the phosphor.

A method of manufacturing a phosphor of the present invention includes: a mixed solution fabrication step in which a metal salt or organometalic salt containing elements constituting a blue phosphor (Ba, Mg, Al, Eu, and M (where M is one kind of the elements Ti, Zr, Si, Ge, Sn and Ce )) is mixed with an aqueous medium to fabricate a mixed solution; and a step of drying the mixed solution, and thereafter firing the mixture in a reducing atmosphere to fabricate $Ba_{1-x}(Mg_{1-a}M_a)(Al_{1-b}M_b)Al_{10}O_{17}:Eu_x$ and $Ba_{1-x-y}Sr_y(Mg_{1-a}M_a)(Al_{1-b}M_b)Al_{10}O_{17}$ (where M is at least one kind of the elements Ti, Zr, Hf, Si, Ge, Sn and Ce ).

DETAILED DESCRIPTION OF PREFERRED EMBODIMENT

First, a description is provided of an advantage of eliminating oxygen vacancy in the vicinity of a Ba—O layer in a blue phosphor.

A phosphor for use in a PDP or other equipment is fabricated by a solid-phase reaction method, an aqueous solution reaction method, or other methods. When a phosphor has smaller particle diameters, defects are likely to occur. Especially for the solid-phase reaction method, it is known that milling a phosphor after firing leads many defects. It is also known that ultraviolet light having a wavelength of 147 nm generated by discharge in driving a panel causes defects in a phosphor (see Electronic Information and Communication Institute, Technical Research Report, EID99-94, Jan. 27, 2000, for example).

Especially for $BaMgAl_{10}O_{17}$:Eu, a blue phosphor, it is known that the phosphor itself has oxygen vacancy especially in a Ba—O layer thereof (see OYO BUTSURI (Applied Physics), vol. 70, No.3, 2001, pp310, for example).

Figure 6:
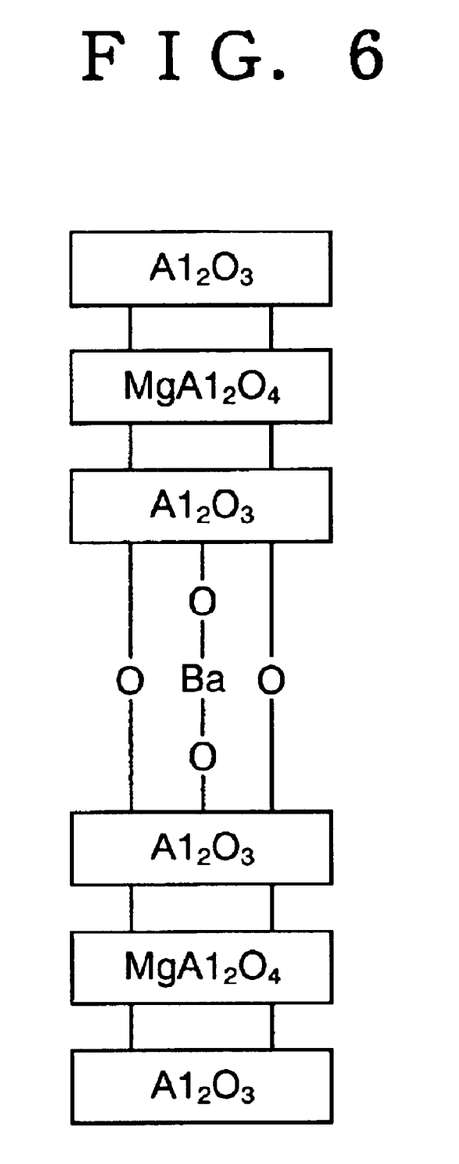
FIG. 6 is a schematic diagram showing an atomic structure of a blue phosphor in accordance with one embodiment of the present invention.

FIG. 6 is a diagram schematically showing a structure of a Ba—O layer in the blue phosphor $BaMgAl_{10}O_{17}$:Eu.

For a conventional blue phosphor, existence of these defects itself has been considered as a cause of luminance degradation. In other words, it has been considered the degradation is caused by defects. Such defects are caused by impact of ions generated in driving a panel on the phosphor and by ultraviolet light having a wavelength of 147 nm.

The inventors have found that the luminance degradation is not only essentially caused by existence of the defects but is caused by selective adsorption of water or carbonic acid gas to oxygen (O) vacancy in the vicinity of a Ba—O layer. By irradiating the adsorption with ultraviolet light or ions, the phosphor reacts with water, thus causing luminance degradation and color shift. In other words, the inventors have come to know that adsorption of water or carbonic acid gas to oxygen vacancy in the vicinity of a Ba—O layer in a blue phosphor causes a various kinds of degradation.

Based on this knowledge, the inventors have decreased oxygen vacancy in the vicinity of a Ba—O layer in a blue phosphor to prevent degradation thereof in a panel manufacturing process and in driving a panel, without decreasing the luminance of the blue phosphor.

In order to decrease the oxygen vacancy in the vicinity of a Ba—O layer, the inventors have substitute a quadrivalent element for part of the element aluminum (Al) or magnesium (Mg) in a blue phosphor having a crystal structure of $BaMgAl_{10}O_{17}$:Eu or $BaSrMgAl_{10}O_{17}$:Eu.

Next, a description is provided of an advantage of substituting quadrivalent ions for part of the element Al or Mg in $BaMgAl_{10}O_{17}$.

The elements Al and Mg in $BaMgAl_{10}O_{17}$:Eu, a blue phosphor, exist as trivalent and divalent ions, respectively.

Positive electrical charges are increased in the crystal by substituting quadrivalent positive ions, such as titanium (Ti), zirconium (Zr), hafnium (Hf), silicon (Si), germanium (Ge), tin (Sn), and cerium (Ce), for any position in the trivalent or divalent ions. In order to neutralize these positive electrical charges (compensate for electrical charges), negatively charged oxygen compensates for oxygen vacancy in the vicinity of the element Ba. As a result, it is considered that the oxygen vacancy in the vicinity of the Ba—O layer can be decreased.

Methods of manufacturing a phosphor of the present invention are described hereinafter.

As methods of manufacturing a phosphor itself, a conventional solid-phase firing method, a liquid-phase method, and a liquid spray method are considered. In the solid-phase firing method, oxide or carbonate materials are fired using a fluxing agent. In the liquid-phase method, a precursor of a phosphor is fabricated using a co-precipitation method of hydrolyzing an organometallic salt or a nitrate in an aqueous solution or forming precipitation by addition of an alkali, and then the precursor is heat-treated. In the liquid spray method, an aqueous solution containing phosphor materials is sprayed into a high-temperature furnace. It has been found that substituting quadrivalent ions (Ti, Zr, Hf, Si, Ge, Sn, or Ce) for part of the element Al or Mg in $BaMgAl_{10}O_{17}$:Eu is effective, in a phosphor fabricated by any method.

Next, as an example of a method of fabricating a phosphor, a description is provided of a method of manufacturing a blue phosphor using a solid-phase reaction method. Carbonates and oxides, such as $BaCO_3$, $MgCO_3$, $Al_2O_3$, $Eu_2O_3$, and $MO_2$ (where M is Ti, Zr, Hf, Si, Ge, Sn, or Ce), as materials, are mixed with a small amount of fluxing agent ($AlF_3$ or $BaCl_2$) as a sintering agent. The mixture is fired at a temperature of 1,400° C. for two hours. Then, the fired mixture is milled and classified. Next, the milled and classified product is fired at a temperature of 1,500° C. for two hours in a reducing atmosphere ($H_2$ (5%)-$N_2$ matrix), and milled and classified again to provide a phosphor.

When a phosphor is fabricated from an aqueous solution (liquid-phase method), organometallic salts containing elements constituting the phosphor, such as alkoxide and acetylacetone, or nitrates are dissolved in water, and then a co-precipitate (hydrate) is obtained by hydrolysis. The hydrate is hydro-thermally synthesized (crystallized in an autoclave), fired in air, or sprayed into a high-temperature furnace to provide fine particles. The fine particles are fired at a temperature of 1,500° C. for two hours in a reducing atmosphere ($H_2$ (5%)-$N_2$ matrix) to provide a phosphor.

Next, the blue phosphor obtained in this method is milled and classified to provide a phosphor.

Preferably, the substitution value of quadrivalent ions (Ti, Zr, Hf, Si, Sn, Ge, or Ce) substituting for Al or Mg ions ranges from 0.01 to 3% of Al or Mg. For a substitution value up to 0.01%, the effect of preventing luminance degradation is small. For a substitution value of at least 3%, the luminance of the phosphor decreases. It has been recognized that the quadrivalent ions have substituted for Al or Mg ions instead of Ba or Eu ions because the blue emission spectrum has a wavelength of 450 nm at any substitution value.

In this manner, substituting quadrivalent ions for Al or Mg ions in a crystal of $BaMgAl_{10}O_{17}$:Eu using the conventional method of fabricating blue phosphor particles can provide a phosphor resistant to water (i.e. durable against water and carbonic acid gas generated in a phosphor firing process, panel sealing process, panel aging process, or in driving a panel) without degradation of the luminance of the blue phosphor.

A plasma display device of the present invention has a PDP in which a plurality of discharge cells of one or a plurality of colors are disposed in arrays, phosphor layers having a color corresponding to the respective discharge cells are disposed, and the phosphor layers are excited by ultraviolet light to emit light. Each of the blue phosphor layer is characterized by being made of blue phosphor particles in which quadrivalent ions (Ti, Zr, Hf, Si, Sn, Ge, or Ce) substitute for Al or Mg ions in a crystal of $BaMgAl_{10}O_{17}$:Eu or $BaSrMgAl_{10}O_{17}$:Eu; that has a uniform particle size distribution.

The diameters of blue phosphor particles in which quadrivalent ions (Ti, Zr, Hf, Si, Sn, Ge, or Ce) substitute for part of Al or Mg ions in $BaMgAl_{10}O_{17}$:Eu or $BaSrMgAl_{10}O_{17}$:Eu are as small as 0.05 to 3 $\mu$m. The particle size distribution of the blue particles is excellent. Further, when each of phosphor particles forming a phosphor layer has a spherical shape, the packing density of the layer increases. This increases the emission area of phosphor particles substantially contributing to light emission. The increased emission area can increase the luminance of a plasma display device and provide a plasma display device that has inhibited luminance degradation and color shift and excellent luminance characteristics.

Now, it is more preferable that the average particle diameter of phosphor particles ranges from 0.1 to 2.0 $\mu$m. As to the particle size distribution, it is more preferable that the maximum particle size is at most four times of the mean value and the minimum value is at least a quarter of the mean value. In a phosphor particle, the area ultraviolet light reaches is as shallow as several hundred nm from the surface of the particle and only the surface thereof emits light. When the diameter of such a phosphor particle is 2.0 $\mu$m or smaller, the surface area of the particle contributing to light emission increases and the emission efficiency of the phosphor layer is kept high. For a diameter of at least 3.0 $\mu$m, the thickness of the phosphor must be at least 20 $\mu$m and a sufficient discharge space cannot be ensured. For a diameter up to 0.1 $\mu$m, defects are likely to occur and the luminance does not increase.

When the thickness of a phosphor layer is set to 8 to 25 times of the average diameter of phosphor particles, a sufficient discharge space can be ensured while the emission efficiency of the phosphor layer is kept high. Therefore, the luminance of a plasma display device can be increased. Especially when the average particle diameter of a phosphor is up to 3 $\mu$m, this effect is greater (see The Institute of Image Information and Television Engineers, IDY2000-317, pp32).

A specific example of phosphor particles used for blue phosphor layers in a plasma display device is made of a compound represented by $Ba_{1-x}MgAl_{10}O_{17}$:$Eu_x$ or $Ba_{1-x-y}Sr_yMgAl_{10}O_{17}$:$Eu_x$. When values X and Y in these compounds are such that $0.03 \leq X \leq 0.20$ and $0.1 \leq Y \leq 0.5$, the blue phosphor layers have a high luminance. Thus, satisfying these conditions is preferable.

A specific example of phosphor particles used for red phosphor layers in a plasma display device is made of a compound represented by $Y_{2-x}O_3$:$Eu_x$ or $(Y,Gd)_{1-x}BO_3$:$Eu_x$. When value X in the compounds of the red phosphor is such that $0.05 \leq X \leq 0.20$, the red phosphor layers have an excellent luminance and resistance to luminance degradation. Thus, satisfying this condition is preferable.

A specific example of phosphor particles used for green phosphor layers in a plasma display device is made of a compound represented by $Ba_{1-x}Al_{12}O_{19}$:$Mn_x$ or $Zn_{2-x}SiO_4$:$Mn_x$. When value X in the compounds of the green phosphor is such that $0.01 \leq X \leq 0.10$, the green phosphor layers have an excellent luminance and resistance to luminance degradation. Thus, satisfying this condition is preferable.

A method of manufacturing a plasma display panel of the present invention is characterized by having a disposing step, firing step and sealing step. In the disposing step, pastes are disposed on a substrate of a first panel. Each kind of the pastes is made of phosphor particles in which quadrivalent ions substitute for Al or Mg ions in the blue phosphor $Ba_{1-x}MgAl_{10}O_{17}$:$Eu_x$ or $Ba_{1-x-y}Sr_yMgAl_{10}O_{17}$:$Eu_x$, red phosphor particles, or green phosphor particles, and a binder. In the firing step, the binder included in each kind of the pastes disposed on the first panel is burnt out. In the sealing step, the first panel having the phosphor particles disposed on the substrate by the firing step, and a second panel are placed one on the other, and sealed. These steps can provide a plasma display device having an excellent luminance and resistance to luminance degradation.

The phosphor of the present invention can also be applied to fluorescent lighting. In this case, the fluorescent lighting is characterized by having a phosphor layer that is excited by ultraviolet light to emit visible light, and the phosphor layer is made of phosphor particles each having water repellent finish on the surface thereof. This structure can provide fluorescent lighting that has phosphor particles having excellent light emission characteristics, luminance, and resistance to luminance degradation.

A plasma display device in accordance with one embodiment of the present invention is described hereinafter with reference to the accompanying drawings.

Figure 1:
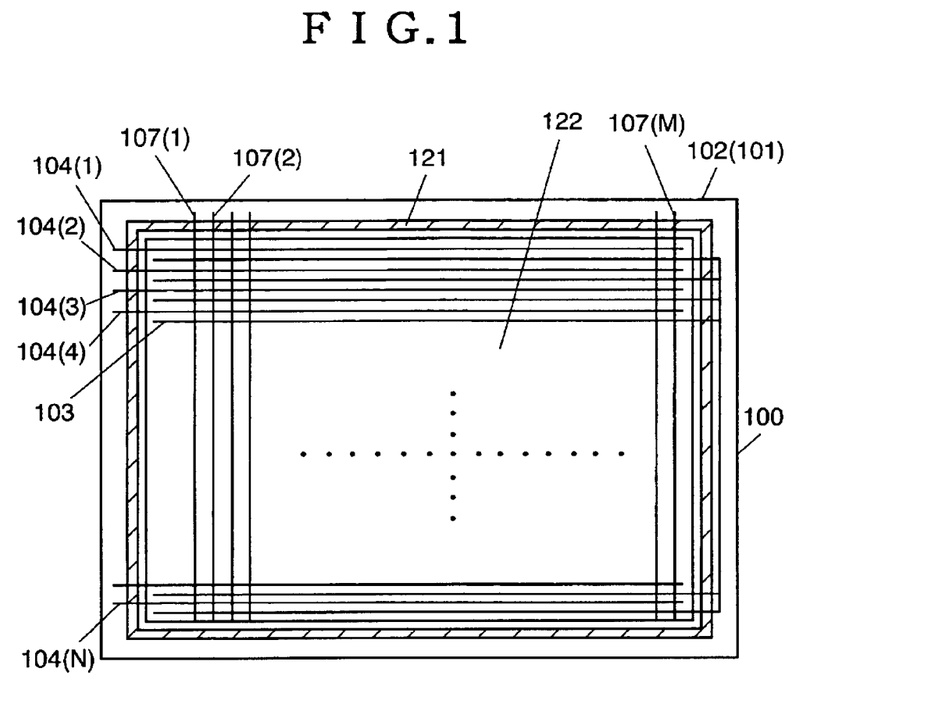
FIG. 1 is a plan view of a plasma display panel (PDP) in accordance with one embodiment of the present invention with a front glass substrate thereof removed.
Figure 2:
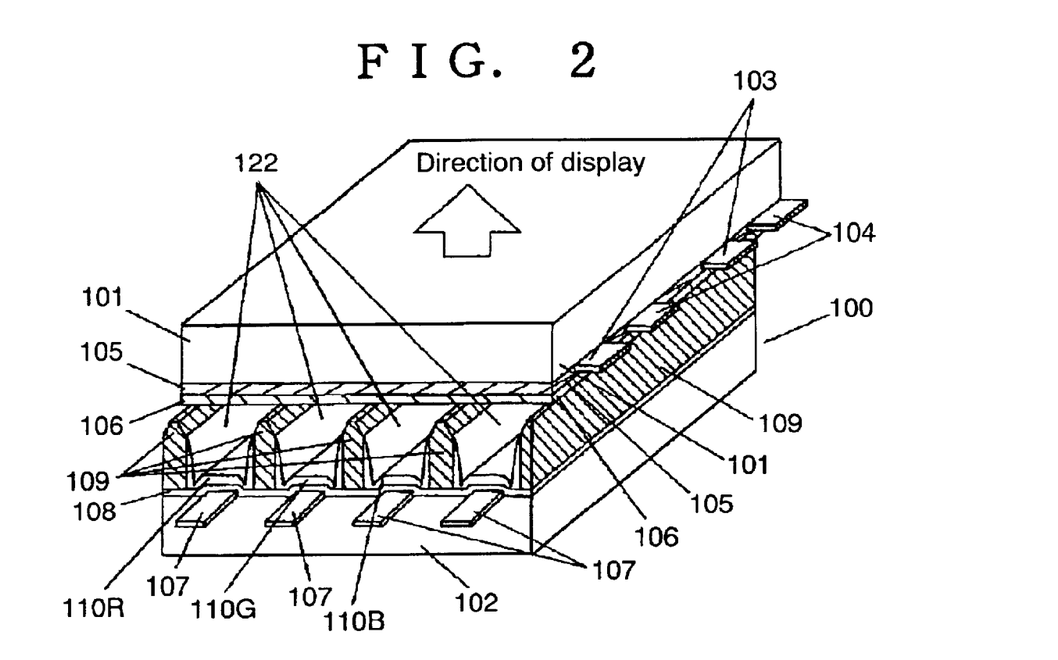
FIG. 2 is a perspective view showing a partial section of a structure of an image display area of the PDP.

FIG. 1 is a schematic plan view of a PDP with a front glass substrate thereof removed. FIG. 2 is a partially sectional view in perspective of an image display area of the PDP. In FIG. 1, the number of display electrodes, display scan electrodes, and address electrodes is reduced to facilitate explanation. With reference to these FIGS. 1 and 2, the structure of a PDP is described.

As shown in FIG. 1, PDP 100 includes front glass substrate 101 (not shown), rear glass substrate 102, N display electrodes 103, N display scan electrodes 104 (Nth electrode indicated by N), M address electrodes 107 (Mth electrode indicated by M), and hermetic seal layer 121 shown by oblique lines. The PDP has an electrode matrix having a three-electrode structure made of respective electrodes 103, 104, and 107. Respective cells are formed at the respective intersections of display scan electrodes 104 and address electrodes 107.

As shown in FIG. 2, this PDP 100 is structured so that a front panel and a rear panel are assembled together and discharge space 122 formed between the front panel and the rear panel is filled with a discharge gas. In the front panel, display electrodes 103, display scan electrodes 104, dielectric glass layer 105, and MgO protective layer 106 are disposed on a principal surface of front glass substrate 101. In the rear panel, address electrodes 107, dielectric glass layer 108, barrier ribs 109, and phosphor layers 110R, 110G and 110B are disposed on a principal surface of rear glass substrate 102. In phosphor layers 110B, a quadrivalent element substitutes for the element Al or Mg in a blue phosphor.

Figure 3:
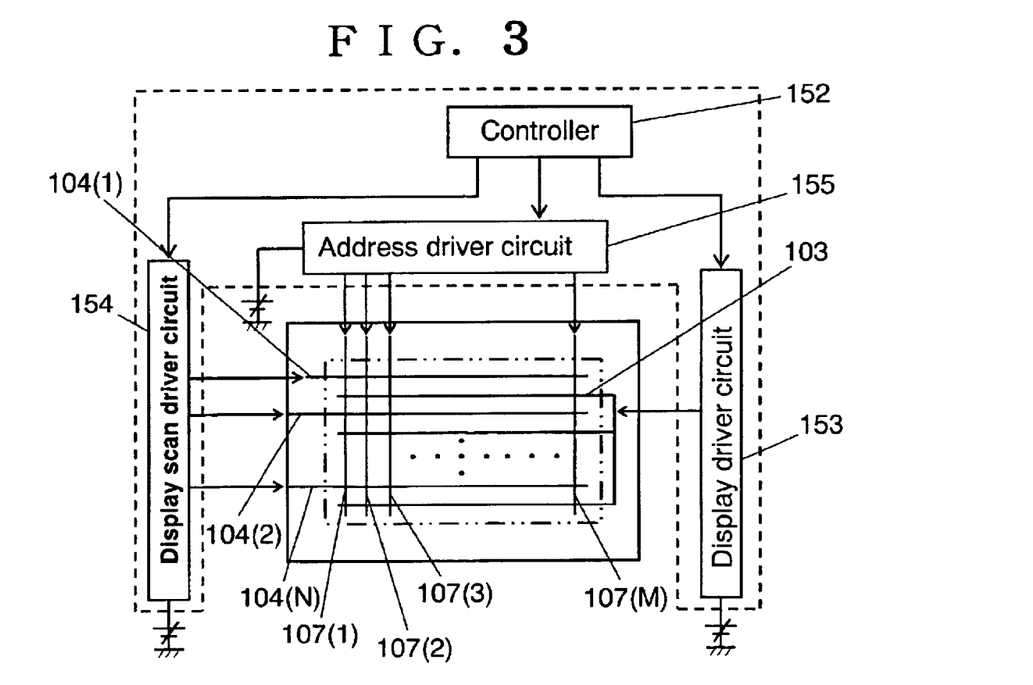
FIG. 3 is a block diagram of a plasma display device in accordance with one embodiment of the present invention.

When an image is displayed on a plasma display device, first, display driver circuit 153, display scan driver circuit 154, and address driver circuit 155 are connected to PDP 100, as shown FIG. 3. Next, according to control of controller 152, a signal voltage is applied across display scan electrode 104 and address electrode 107 of a cell to be lit for address discharge therebetween. Then, a pulse voltage is applied across display electrode 103 and display scan electrode 104 for sustain discharge. This sustain discharge generates ultraviolet light in the cell. The phosphor layer excited by this ultraviolet light emits light, thus lighting the cell. Combination of lit and unlit cells of the respective colors provides image display.

Next, a method of manufacturing this PDP 100 is described with reference to FIGS. 4 and 5.

(1) Production of Front Panel

First, N display electrodes 103 and N display scan electrodes 104 are arranged on front glass substrate 101 alternately, in parallel with each other, like stripes. (In FIG. 2, only two of respective electrodes are shown for simplicity.) Thereafter, the electrodes are covered with dielectric glass layer 105, and MgO protective layer 106 is further formed over the surface of dielectric glass layer 105.

Display electrodes 103 and display scan electrodes 104 are made of silver. These electrodes are formed by applying a silver paste for electrodes by screen-printing and firing the paste.

Dielectric glass layer 105 is formed by applying a paste containing lead glass material by screen-printing, and firing the paste at a specified temperature for a specified period of time (e.g. at 56° C. for 20 min.) so that the layer has a specified thickness (approx. 20 $\mu$m). Examples of the paste containing lead glass material to be used include a mixture of PbO (70 wt %), $B_2O_3$ (15 wt %), $SiO_2$ (10 wt %), $Al_2O_3$ (5 wt %) and an organic binder ($\alpha$-terpineol containing 10% of ethyl cellulose dissolved therein).

The organic binder contains a resin dissolved in an organic solvent. Acrylic resin can be used as a resin other than the ethyl cellulose, and n-butylcarbitol as an organic solvent. Further, a dispersion agent (e.g. glyceryl trileate) can be mixed into such an organic binder.

MgO protective layer 106 is made of magnesium oxide (MgO). The layer is formed by sputtering method or chemical vapor deposition (CVD) method, for example, to have a specified thickness (approx. 0.5 $\mu$m).

(2) Production of Rear Panel

First, M address electrodes 107 are formed in lines by screen-printing a silver paste for electrodes on rear glass substrate 102 and firing the paste. Next, dielectric glass layer 108 is formed by applying a paste containing lead glass material to the address electrodes by a screen-printing method. Barrier ribs 109 are formed by repeatedly applying the same paste containing lead glass material to the dielectric glass layer by the screen-printing method at a specified pitch and firing the paste. These barrier ribs 109 partition discharge space 122 into respective cells (unit emission area) in the direction of the lines.

Figure 4:
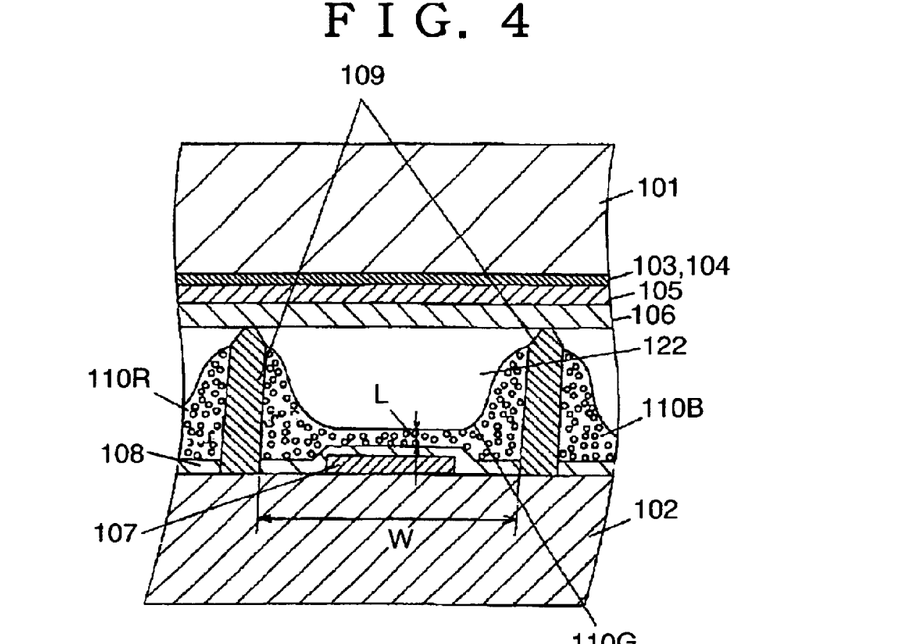
FIG. 4 is a sectional view of an image display area of a PDP in accordance with one embodiment of the present invention.

FIG. 4 is a partially sectional view of PDP 100. As shown in the drawing, interval dimension W between barrier ribs 109 is specified to a value ranging from approx. 130 to 240 $\mu$m, according to a HDTV screen having a diagonal size ranging from 32 to 50 in.

Paste-like phosphor ink made of red (R), green (G), or blue (B) phosphor particles and an organic binder is applied to grooves between barrier ribs 109, and fired at temperatures ranging from 400 to 590° C. to burn out the organic binder. Thus, phosphor layers 110R, 110G, and 110B in which phosphor particles of corresponding colors are bound are formed. In the blue phosphor particles, quadrivalent element ions substitute for Al or Mg element ions in $Ba_{1-x}MgAl_{10}O_{17}:Eu_x$ or $Ba_{1-x-y}Sr_yMgAl_{10}O_{17}:Eu_x$.

It is preferable that thickness L of each of these phosphor layers 110R, 110G, and 110B on address electrode 107 in the direction of lamination is approx. 8 to 25 times of the average diameter of the phosphor particles of each color. In other words, in order to ensure a certain luminance (emission efficiency) when a phosphor layer is irradiated with a specified amount of ultraviolet light, the phosphor layer needs to absorb ultraviolet light generated in the discharge space instead of allowing it to pass through. For this purpose, it is desirable that the phosphor layer has a thickness in which at least eight layers, preferably, approx. 20 layers are laminated. For a thickness larger than that, the emission efficiency of the phosphor layer is almost saturated. Further, for a thickness exceeding lamination of approx. 20 layers, sufficiently large discharge space 122 cannot be ensured.

Phosphor particles having sufficiently small diameters and spherical shapes, like those obtained by hydrothermal synthesis or other methods, have a packing factor of the phosphor layer and a total surface area of the phosphor particles larger than those of phosphor particles having non-spherical shapes, even when the number of laminated layers are the same. As a result, for phosphor particles having spherical shapes, the surface areas thereof contributing to actual light emission of the phosphor layer are increased and the emission efficiency is further increased. Descriptions are given later of a method of synthesizing these phosphor layers 110R, 110G, and 110B, and a method of fabricating blue phosphor particles for use in the blue phosphor layer employing substitution of quadrivalent ions.

(3) Production of PDP by Assembly Panels

The front panel and the rear panel produced in this manner are placed one on the other so that respective electrodes on the front panel are orthogonal to the address electrodes on the rear panel. A sealing glass is inserted between the panels in the periphery thereof and fired at a temperature of approx. 450° C. for 10 to 20 min., for example, to from hermetical seal layer 121 (see FIG. 1) for sealing. Next, discharge space 122 is once evacuated to a high vacuum (e.g. $1.1 \times 10^{-4}$ Pa) and filled with a discharge gas (e.g. He—Xe or Ne—Xe inert gas) at a specified pressure, to provide PDP 100.

(4) A Method of Forming Phosphor Layers

Figure 5:
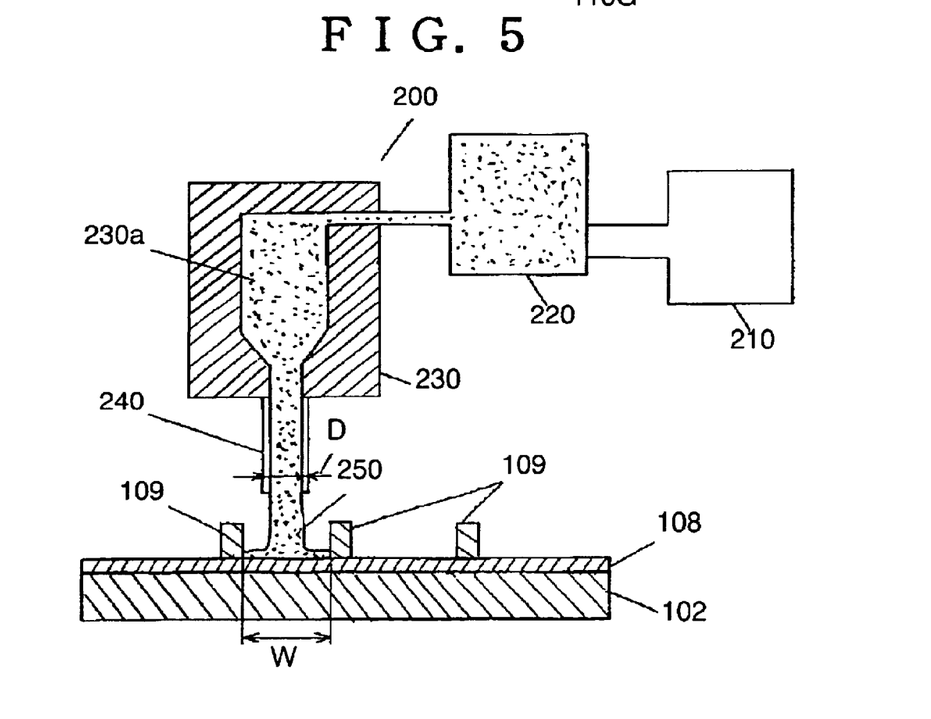
FIG. 5 is a schematic diagram showing a structure of an ink dispenser used when phosphor layers of the PDP is formed.

FIG. 5 is a schematic diagram showing a structure of ink dispenser 200 for use in forming phosphor layers 110R, 110G, and 110B. As shown in FIG. 5, ink dispenser 200 includes server 210, pressure pump 220, and header 230. Phosphor ink is pressurized by pressure pump 220 and supplied from server 210 for storing the phosphor ink to header 230.

The ink dispenser is structured so that header 230 has ink chamber 230a and nozzle 240, and the phosphor ink pressurized and supplied to ink chamber 230a is continuously ejected from nozzle 240. It is desirable that bore diameter D of this nozzle 240 is set to at least 30 $\mu$m in order to prevent clogging of the nozzle. It is also desirable that bore diameter D is equal to or smaller than interval W between barrier ribs 109 (approx. 130 to 200 $\mu$m) in order to prevent displacement of a phosphor layer from the barrier ribs in application. Thus, bore diameter D is generally set to 30 to 130 $\mu$m.

Header 230 is structured to be driven lineally by a header scanning mechanism (not shown). Continuously ejecting phosphor ink 250 from nozzle 240 and scanning header 230 at the same time allows the phosphor ink to be uniformly applied to the grooves between barrier ribs 109 on rear glass substrate 102. Viscosity of the phosphor ink used in this embodiment is kept within the range of 1,500 to 3,000 centipoises (CP) at a temperature of 25° C.

This server 210 also has a mixer (not shown). Mixing prevents precipitation of particles in phosphor ink. Header 230 is integrally formed with ink chamber 230a and nozzle 240 by performing machining and electric discharge machining on a metallic material.

The methods of forming phosphor layers are not limited to the above method. Other various kinds of usable methods include photolithography, screen-printing, and a method of disposing a film including phosphor particles mixed therein.

The phosphor ink is prepared by mixing phosphor particles of each color, a binder and a solvent so that the mixture has a viscosity ranging from 1,500 to 3,000 centipoises (CP). A surface-active agent, silica, a dispersant agent (0.1 to 5 wt %) can also be added, as required.

Used as a red phosphor included in this phosphor ink is a compound represented by $(Y,Gd)_{1-x}BO_3:Eu_x$ or $Y_{2-x}O_3:Eu_x$. In these compounds, the element Eu substitutes for part of the element Y constituting the matrix of the compounds. It is preferable that the substitution value X of the element Eu with respect to the element Y is $0.05 \leq X \leq 0.20$. For a substitution value larger than this value, the phosphor has a high luminance but considerable luminance degradation. For this reason, it is considered that the red phosphor cannot be used practically. For a substitution value smaller than this value, the composition ratio of Eu mainly emitting light is small and thus the luminance decreases. Therefore, the red phosphor cannot be used as a phosphor.

Used as a green phosphor is a compound represented by $Ba_{1-x}Al_{12}O_{19}:Mn_x$ or $Zn_{2-x}SiO_4:Mn_x$. $Ba_{1-x}Al_{12}O_{19}:Mn_x$ is a compound in which the element Mn substitutes for part of the element Ba constituting the matrix of the compound. $Zn_{2-x}SiO_4:Mn_x$ is a compound in which the element Mn substitutes for part of the element Zn constituting the matrix of the compound. It is preferable that the substitution value X of the element Mn with respect to the elements Ba and Zn is $0.01 \leq X \leq 0.10$ for the reason described in the case of the red phosphor.

Used as a blue phosphor is a compound represented by $Ba_{1-x}MgAl_{10}O_{17}:Eu_x$ or $Ba_{1-x-y}Sr_yMgAl_{10}O_{17}:Eu_x$. $Ba_{1-x}MgAl_{10}O_{17}:Eu_x$ and $Ba_{1-x-y}Sr_yMgAl_{10}O_{17}:Eu_x$ are compounds in which the element Eu or Sr substitutes for part of the element Ba constituting the matrix of the compounds. It is preferable that the substitution value X of the element Eu and substitution value Y of the element Sr with respect to the element Ba are $0.03 \leq X \leq 0.20$ and $0.1 \leq Y \leq 0.5$, respectively, for the reason described in the above case.

It is also preferable that the substitution values of quadrivalent ions (Ti, Zr, Hf, Si, Ge, Sn, or Ce) substituting for the element Al or Mg is $0.001 \leq a \leq 0.03$ and $0.001 \leq b \leq 0.03$, in $Ba(Mg_{1-a}M_a)(Al_{1-b}M_b)_{10}O_{17}:Eu_x$. In other words, it is preferable that the substitution values ranges from 0.1 to 3%.

Ethyl cellulose or acrylic resin can be used as a binder included in phosphor ink (in an amount of 0.1 to 10 wt % of the ink) and α-terpineol or n-butylcarbitol can be used as a solvent. Polymers, such as PMA and PVA, can also be used as a binder, and organic solvent, such as diethyleneglycol and methyl ether, can also be used as a solvent.

The phosphor particles used in this embodiment are manufactured by a solid-phase firing method, aqueous solution reaction method, spray firing method, or hydrothermal synthesis method.

(1) Blue Phosphor
$Ba_{1-x}MgAl_{10}O_{17}:Eu_x$

First, in a mixed solution fabrication process, materials, i.e. barium nitrate $(Ba(NO_3)_2)$, magnesium nitrate $(Mg(NO_3)_2)$, aluminum nitrate $(Al(NO_3)_3)$, and europium nitrate $(Eu(NO_3)_2)$ are mixed in a molar ratio of $Ba(NO_3)_2$:$Mg(NO_3)_2$:$Al(NO_3)_3$:$Eu(NO_3)_2$=1-X:1:10:X ($0.03 \leq X \leq 0.25$). This mixture is dissolved in an aqueous medium to provide hydrate mixed solution. As this aqueous medium, ion-exchange water or pure water is preferable because they contain no impurities. However, non-aqueous solvent (e.g. methanol and ethanol) can be contained in the aqueous medium.

Used as materials for substituting quadrivalent ions (Ti, Zr, Hf, Si, Sn, Ge, or Ce) for Mg or Al are nitrates, chlorides, or organic compounds of the quadrivalent ions. As for the substitution values of the materials, the materials are mixed to provide $0.001 \leq a$ and $b \leq 0.03$ in $(Mg_{1-a}M_a)(Al_{1-b}M_b)$ where M is a quadrivalent ion.

Next, the hydrate mixed solution is held in a container made of a corrosion- and heat-resistant material, such as gold and platinum. Then the mixed solution is hydrothermally synthesized for 12 to 20 hours, at specified temperatures (100 to 350° C. under specified pressures (0.2 to 25 MPa), in a high pressure vessel, using equipment capable of heating and pressurizing at the same time, such as an autoclave.

Next, these particles are fired in a reducing atmosphere containing 5% of hydrogen and 95% of nitrogen, for example, at a specified temperature for a specified period of time (e.g. at 1,350° C. for two hours). Thereafter, the fired particles are classified to provide a desired blue phosphor, $Ba_{1-x}MgAl_{10}O_{17}:Eu_x$, in which quadrivalent ions substitute for part of the elements Mg or Al.

The phosphor particles obtained by hydrothermal synthesis have spherical shapes and an average particle diameter ranging from approx. 0.05 to 2.0 μm, which is smaller than that of particles fabricated by the conventional solid-phase reaction method. Now, the term "spherical" as used herein is defined so that the aspect ratios (minor axis diameter/major axis diameter) of most of the phosphor particles range from 0.9 to 1.0, for example. Not all the phosphor particles need to fall within this range.

The hydrate mixture can be sprayed from a nozzle into a high-temperature furnace to synthesize a phosphor instead of being held in a gold or platinum container. This method is known as a spray method and the blue phosphor can also be manufactured by the spray method.
$Ba_{1-x-y}Sr_yMgAl_{10}O_{17}:Eu_x$ This phosphor is made of materials different from those of the above $Ba_{1-x}MgAl_{10}O_{17}:Eu_x$, and fabricated by a solid reaction method. The materials used are described hereinafter.

The materials, i.e. barium hydroxide $(Ba(OH)_2)$, strontium hydroxide $(Sr(OH)_2)$, magnesium hydroxide $(Mg(OH)_2)$, aluminum hydroxide $(Al(OH)_3)$, and europium hydroxide $(Eu(OH)_2)$ are weighted in a required molar ratio. Next, oxides or hydroxides containing quadrivalent ions (Ti, Zr, Hf, Si, Ge, Sn, or Ce) for substituting for Mg or Al are weighted in a required ratio. These materials are mixed together with $AlF_3$, a fluxing agent. The mixture is fired at specified temperatures (1,300 to 1400° C.) for specified periods of time (12 to 20 hours.) Thus, $Ba_{1-x-y}Sr_yMgAl_{10}O_{17}:Eu_x$ in which quadrivalent ions substitute for Mg or Al can be obtained. The average diameter of the phosphor particles obtained by this method ranges from approx. 0.1 to 3.0 μm.

Next, the phosphor is fired in a reducing atmosphere (containing 5% of hydrogen and 95% of nitrogen, for example) at specified temperatures (1,000 to 1,600° C.) for two hours, and thereafter classified by an air classifier to provide phosphor particles. Mainly used as the materials of the phosphor are oxides, nitrates, and hydroxides. However, the phosphor can also be fabricated using organometallic compounds containing the elements Ba, Sr, Mg, Al, Eu, Ti, Zr, Hf, Si, Sn, Ge, and Ce, such as metal alkoxide and acethylacetone.

(2) Green Phosphor $Zn_{2-x}SiO_4:Mn_x$

First, in a mixed solution fabrication process, materials, i.e. zinc nitrate ($Zn(NO_3)$), silicon nitrate ($Si(NO_3)_2$), and manganese nitrate ($Mn(NO_3)_2$) are mixed in a molar ratio of $Zn(NO_3):Si(NO_3)_2:Mn(NO_3)_2=2-X:1:X (0.01 \leq X \leq 0.10)$. Next, this mixed solution is sprayed from a nozzle into a furnace heated to a temperature of 1,500° C. while ultrasonic waves are applied thereto. Thus, the green phosphor is fabricated.

$Ba_{1-x}Al_{12}O_{19}:Mn_x$

First, in a mixed solution fabrication process, materials, i.e. barium nitrate ($Ba(NO_3)_2$), aluminum nitrate ($Al(NO_3)_2$), and manganese nitrate ($Mn(NO_3)_2$), are mixed in a molar ratio of $Ba(NO_3)_2:Al(NO_3)_2:Mn(NO_3)_2=1-X:12:X$ ($0.01 \leq X \leq 0.10$). This mixture is dissolved in ion-exchange water to provide a mixed solution.

Next, in a hydration process, an aqueous base (e.g. ammonia aqueous solution) is dropped into this mixed solution to form a hydrate. Thereafter, in a hydrothermal synthesis process, this hydrate and ion-exchange water is held in a capsule made of a corrosion- and heat-resistant material, such as platinum and gold. This solution is hydrothermally synthesized at specified temperatures under specified pressures for specified periods of time (e.g. 100 to 300° C., 0.2 to 10 MPa, 2 to 20 hours) in a high pressure vessel, using an autoclave, for example.

Thereafter, the compound is dried to provide a desired $Ba_{1-x}Al_{12}O_{19}:Mn_x$. The phosphor obtained by this hydrothermal synthesis process has particle diameters ranging from approx. 0.1 to 2.0 μm and spherical shapes. Next, these particles are annealed in air at temperatures ranging from 800 to 1,100° C., and classified to provide the green phosphor.

(3) Red Phosphor $(Y,Gd)_{1-x}BO_3:Eu_x$

First, in a mixed solution fabrication process, materials, i.e. yttrium nitrate ($Y_2(NO_3)_2$), hydro nitrate gadolinium ($Gd_2(NO_3)_3$), boric acid ($H_3BO_3$), and europium nitrate ($Eu_2(NO_3)_3$) are mixed in a molar ratio as an oxide of $1-X:2:X$ ($0.05 \leq X \leq 0.20$) and a ratio of Y:Gd=65:35. Next, this mixed solution is heat-treated in air at temperatures ranging 1,200 to 1,350° C. for two hours and classified to provide the red phosphor.

$Y_{2-x}O_3:Eu_x$

First, in a mixed solution fabrication process, materials, i.e. yttrium nitrate ($Y_2(NO_3)_2$) and europium nitrate ($Eu(NO_3)_2$) are mixed in a molar ratio of $Y_2(NO_3)_2:Eu(NO_3)_2=2-X:X$ ($0.05 \leq X \leq 0.30$). This mixture is dissolved in ion-exchange water to provide a mixed solution.

Next, in a hydration process, an aqueous base (e.g. ammonia aqueous solution) is added to this mixed solution to provide a hydrate.

Thereafter, in a hydrothermal synthesis process, this hydrate and ion-exchange water is held in a container made of a corrosion- and heat-resistant material, such as platinum and gold. This mixture is hydro-thermally synthesized at temperatures ranging from 100 to 300° C., under pressures ranging from 0.2 to 10 MPa, for 3 to 12 hours, in a high pressure vessel, using an autoclave, for example. Then, the obtained compound is dried to provide a desired $Y_{2-x}O_3:Eu_x$.

Next, this phosphor is annealed in air at temperatures ranging from 1,300 to 1,400° C. for two hours, and classified to provide the red phosphor. The phosphor obtained by this hydrothermal synthesis process has particle diameters ranging from approx. 0.1 to 2.0 μm and spherical shapes. These particle diameters and shapes are suitable for forming a phosphor layer having excellent light emission characteristics.

Conventionally used phosphors are used for phosphor layers 110R and 110G of the above PDP100. Used for phosphor layer 110B are phosphor particles in which quadrivalent ions substitute for part of Mg or Al ions constituting the phosphor. Especially, the conventional blue phosphor has more degradation than the blue phosphor of the present invention in each process, and thus the color temperature of white tends to decrease when the three colors emit light at the same time.

For this reason, in a plasma display device, the color temperature of white display has been improved by decreasing the luminance of phosphor cells of colors other than blue (i.e. red and green), using circuits. However, the use of a blue phosphor of the present invention increases the luminance of blue cells and decreases luminance degradation in the panel manufacturing process. This eliminates the need of intentionally decreasing the luminance of the cells of other colors and thus the need of intentionally decreasing the luminance of the cells of all the colors. Therefore, because the luminance of the cells of all the colors can fully be utilized, the luminance of the plasma display device can be increased while the color temperature of white display is kept high.

The blue phosphor of the present invention can be applied to fluorescent lighting that is excited by ultraviolet light to emit light in a similar manner. In this case, a phosphor layer including conventional blue phosphor particles that is applied to the inner wall of a fluorescent tube is replaced with a phosphor layer in which quadrivalent ions substitute for Mg or Al ions.

Application of the present invention to fluorescent lighting in this manner can provide fluorescent lighting having a luminance and resistance to luminance degradation more excellent than those of conventional fluorescent lighting.

In order to evaluate the performance of a plasma display device of the present invention, samples based on the preferred embodiment were produced and performance evaluation tests were performed on the samples. The experimental results are described below.

Each of the plasma display devices was produced to have a diagonal size of 42 in. (HDTV screen having a rib pitch of 150 μm). Each of the plasma display devices was produced so that the dielectric glass layer was 20 μm thick, the MgO protective layer was 0.5 μm thick, and the distance between the display electrode and the display scan electrode was 0.08 mm. The discharge gas charged into the discharge space essentially consists of neon and contains 5% of xenon gas mixed therein.

In the blue phosphor particles of Sample Nos. 1 though 10 used for the plasma display devices, quadrivalent ions substitute for Mg or Al ions constituting respective phosphors. The synthesis conditions are shown in Table 1.

TABLE 1

| Sample No. | Amount of Eu x, y | Manufacturing method | Quadrivalent element substituting for Al or Mg/Amount (%) | Amount of Eu X | Manufacturing method | Amount of Mn X | Manufacturing method |
|---|---|---|---|---|---|---|---|
| | Blue phosphor $[Ba_{1-x}MgAl_{10}O_{17}:Eu_x]$ | | | Red phosphor $[(Y, Gd)_{1-x}BO_3:Eu_x]$ | | Green phosphor $[Zn_{2-x}SiO_4:Mn]$ | |
| 1 | X = 0.03 | Hydrothermal synthesis method | Ti 0.1% | X = 0.1 | Solid-phase reaction method | X = 0.01 | Spray method |
| 2 | X = 0.05 | Solid-phase reaction method (Flux method) | Zr 0.2% | X = 0.2 | Spray method | X = 0.02 | Hydrothermal synthesis method |
| 3 | X = 0.1 | Spray method | Si 0.5% | X = 0.3 | Aqueous solution reaction method | X = 0.05 | Solid-phase reaction method |
| 4 | X = 0.2 | Aqueous solution reaction method | Hf 1.0% | X = 0.15 | Hydrothermal synthesis method | X = 0.1 | Solid-phase reaction method |
| | Blue phosphor $[Ba_{1-x-y}Sr_yAl_{10}O_{17}:Eu_x]$ | | | Red phosphor $[Y_{2-x}O_3:Eu_x]$ | | Green phosphor $[Ba_{1-x}Al_{12}O_{19}:Mn_x]$ | |
| 5 | X = 0.03, y = 0.1 | Solid-phase reaction method (Flux method) | Sn 1.0% | X = 0.01 | Hydrothermal synthesis method | X = 0.01 | Hydrothermal synthesis method |
| 6 | X = 0.1, y = 0.3 | Hydrothermal synthesis method | Si 3.0% | X = 0.1 | Spray method | X = 0.02 | Spray method |
| 7 | X = 0.1, y = 0.5 | Spray method | Ge 2.0% | X = 0.15 | Aqueous solution reaction method | X = 0.05 | Solid-phase reaction method |
| 8 | X = 0.2, y = 0.3 | Solid-phase reaction method | Ti, Si 1.0%, 1.0% | X = 0.2 | Solid-phase reaction method | X = 0.1 | Solid-phase reaction method |
| 9 | " | Solid-phase reaction method | Ce 1.0% | " | Solid-phase reaction method | " | Solid-phase reaction method |
| 10 | X = 0.1, y = 0.5 | Solid-phase reaction method | Ti, Zi 1.0%, 1.0% | X = 0.15 | Aqueous solution reaction method | X = 0.01 | Hydrothermal synthesis method |
| *11 | " | Solid-phase reaction method | None | " | Aqueous solution reaction method | " | Hydrothermal synthesis method |

*Sample No. 11 shows a comparative example.

With reference to Table 1, for each of Sample Nos. 1 through 4, $(Y,Gd)_{1-x}BO_3:Eu_x$ red phosphor, $Zn_{2-x}SiO_4:Mn_x$ green phosphor, and $Ba_{1-x}MgAl_{10}O_{17}:Eu_x$ blue phosphor are used in combination. The method of synthesizing the phosphors, the substitution ratios of Eu and Mn mainly emitting light, (i.e. the substitution ratios of Eu to the elements Y and Ba and the substitution ratio of Mn to the element Zn), and the kind and amount of quadrivalent ions (element) substituting for Mg or Al are changed as shown in Table 1.

For each of Sample Nos. 5 through 10, $Y_{2-x}O_3:Eu_x$ red phosphor, $Ba_{1-x}Al_{12}O_{19}:Mn_x$ green phosphor, and $Ba_{1-x-y}Sr_yAl_{10}O_{17}:Eu_x$ blue phosphor are used in combination. Similar to the above case, the conditions for the method of synthesizing the phosphors, the substitution ratios of the elements mainly emitting light, the kind and amount of quadrivalent ions (element) substituting for Mg or Al ions constituting the blue phosphor are changed as shown in Table 1.

Phosphor ink used for forming a phosphor layer is prepared by using each kind of phosphor particles shown Table 1, and mixing the phosphor, a resin, solvent and dispersion agent. According to the measurement results, viscosity of each kind of the phosphor ink (at 25° C.) is kept within the range of 1,500 to 30,000 CP. According to observations of each phosphor layer formed, the phosphor ink is uniformly applied to the side faces of the barrier ribs.

As for the phosphor particles used for a phosphor layer of each color, those having an average diameter ranging from 0.1 to 3.0 μm and a maximum diameter up to 8 μm are used in each sample.

Sample No. 11 shows a comparative example using conventional phosphor particles in which no special treatment is performed on the phosphor particles of each color.

EXPERIMENT 1

Model experiments were performed on Sample Nos. 1 through 10 and Sample No. 11 (a comparative example) to determine luminances and luminance degradation factors. In the model experiments, these phosphors were fired (520° C., 20 min.) in the rear panel manufacturing process to determine how the luminance of each color changed. The luminance of the particles before firing and the luminance of the applied paste after firing were measured. The luminance degradation factor of each color before and after firing was measured.

EXPERIMENT 2

Measured was the luminance degradation factor of each phosphor before and after the panel assembly step (sealing at 45° C. for 20 min.) in the panel manufacturing process.

EXPERIMENT 3

When each panel was lit in each color, a luminance and luminance degradation factor were measured as follows. Discharge sustain pulses at a voltage of 200V and at a frequency of 100 kHz were applied to each plasma display device continuously for 100 hours, luminances of each panel was measured before and after the application of the pulses, and a luminance degradation factor (([luminance after application−luminance before application]/luminance before application)*100) was determined.

Addressing failure at address discharge was determined by existence of flickers in an image. If flickers were found even only in one position, it was recognized as having flickers. As for the luminance distribution of each panel, a luminance was measured with a luminance meter when white color was displayed and the distribution on the entire surface was shown.

Shown in Table 2 are results of the luminances and the luminance degradation factors of each color in these experiments 1 through 3.

TABLE 2

| Sample No. | Luminance degradation factor (%) of phosphor fired (520° C.) in rear panel manufacturing process | | | Luminance degradation factor (%) of phosphor when panels are sealed (450° C.) in panel assembly process | | | Luminance degradation factor (%) of phosphor after application of discharge sustain pulses (200 V, 100 kHz, 100 hours) | | | Existence of addressing failure at address discharge | Luminance at blue display on the entire cd/cm$^2$ |
|---|---|---|---|---|---|---|---|---|---|---|---|
| | Blue | Red | Green | Blue | Red | Green | Blue | Red | Green | | |
| 1 | −0.5 | −1.2 | −4.9 | −2.8 | −2.6 | −13.0 | −2.4 | −4.4 | −14.5 | Not exist | 80.4 |
| 2 | −0.7 | −1.3 | −4.0 | −2.1 | −2.4 | −13.2 | −2.3 | −4.1 | −14.2 | " | 83.2 |
| 3 | −0.4 | −1.4 | −4.5 | −2.5 | −2.3 | −12.9 | −2.4 | −4.0 | −14.6 | " | 89.5 |
| 4 | −0.3 | −1.4 | −4.7 | −2.0 | −2.2 | −12.7 | −2.0 | −4.2 | −14.1 | " | 89.4 |
| 5 | −0.4 | −1.5 | −4.9 | −2.2 | −2.0 | −12.9 | −2.2 | 4.3 | −14.8 | " | 87 |
| 6 | −0.8 | −1.2 | −4.3 | −2.4 | −2.3 | −12.6 | −2.1 | −4.1 | −14.9 | " | 90.1 |
| 7 | −0.6 | −1.4 | −4.5 | −2.2 | −2.4 | −12.3 | −2.5 | −4.2 | −14.7 | " | 88.5 |
| 8 | −0.5 | −1.2 | −4.3 | −2.5 | −2.5 | −12.5 | −2.3 | −4.3 | −15.1 | " | 92.5 |
| 9 | −0.4 | −1.5 | −4.1 | −1.8 | −2.1 | −12.8 | −3.9 | −4.1 | −15.6 | " | 93 |
| 10 | −0.5 | −1.3 | −4.2 | −1.9 | −2.3 | −13.0 | −1.8 | −4.1 | −14.8 | " | 89.4 |
| *11 | −5.5 | −1.5 | −4.1 | −21.5 | −2.1 | −13.2 | −35 | −4.1 | −15.6 | Exist | 45.8 |

*Sample No. 11 shows a comparative example.

As shown in Table 2, for Sample No. 11 in which substitution of quadrivalent ions is not performed in the blue phosphor, the luminance degradation factors in each process are large. Especially for the blue phosphor, a luminance degradation factor of 5.5% is seen in the phosphor firing process, 21.5% in the sealing process, and 35% in an acceleration life test (200V, 100 kHz). In contrast, for Sample Nos. 1 through 10, all the degradation factors of the blue phosphors are 3% or smaller. Additionally, no addressing failure is found.

This is because quadrivalent ions (element) (Ti, Zi, Hf, Si, Ge, Sn, or Ce) have substituted for Mg or Al ions (element) constituting a blue phosphor and this substitution has drastically reduced oxygen vacancy in the blue phosphor (especially oxygen vacancy in the vicinity of a Ba—O layer). This prevents defective layers (oxygen vacancy in the vicinity of the Ba—O layer) on the surface of the phosphor from adsorbing water included in the ambient atmosphere in firing the phosphor or water in MgO or barrier ribs, sealing frit, and the phosphor in sealing panels.

EXPERIMENT 4

Model experiments were performed on phosphors in which quadrivalent (element) ions had not substituted for Mg or Al (element) ions in blue phosphors thereof. The phosphors were left in an atmosphere at a temperature of 60° C. and a relative humidity of 90% for 10 min., and dried at a temperature of 100° C. Then, temperature-programmed desorption gas chromatograph-mass spectrometry (TDS analysis) was performed on these phosphors. The analyses show that the peaks of physically adsorbed water (approx. 100° C.) and chemically adsorbed water (300 to 500° C.) are ten times as high as those in the samples subjected to substitution (Sample Nos. 1 through 10).

EXPERIMENT 5

Shown in the Experiment 1 are examples in which blue phosphors of the present invention are used in plasma display devices. A sample of fluorescent lighting using a phosphor of the present invention in which quadrivalent ions substitute for Mg or Al in a blue phosphor thereof was produced for fluorescent lighting excited by ultraviolet light to emit light in a similar manner.

Phosphors of each color produced under the condition of Sample No. 7 of Table 1 were mixed and the mixture was applied to the inner wall of a glass tube, as a phosphor layer of known fluorescent lighting, to provide Sample No. 12. As a comparative example thereof, phosphors of each color produced by a conventional solid-phase reaction method without substitution (see Table 1) were also mixed and applied, to provide Sample No. 13. Table 3 shows the results.

TABLE 3

| Sample No. | Phosphor | Luminance (cd/m$^2$) | Luminance degradation after 5,000 hours (100 V, 60 Hz) |
|---|---|---|---|
| 12 | Phosphor of Sample No. 7 | 6,750 | −1.00% |
| 13* | Phosphor of Sample No. 11 | 6,600 | −14.6% |

*Sample No. 13 shows a comparative example

INDUSTRIAL APPLICABILITY

As described above, in accordance with the present invention, substituting a quadrivalent element for the element Mg or Al in the crystal of a blue phosphor constituting a phosphor layer can prevent degradation of the phosphor layer in each manufacturing process. This method can improve luminance, life and reliability of a panel and lamp.

What is claimed is:

1. A plasma display device having a plasma display panel in which a plurality of discharge cells having one of one and a plurality of colors are disposed, phosphor layers having a color corresponding to said respective discharge cells are disposed, and said phosphor layers are excited by ultraviolet light to emit light, wherein said phosphor layers have a blue phosphor, and said blue phosphor is made of one of compounds represented by $Ba_{1-x}MgAl_{10}O_{17}:Eu_x$ and $Ba_{1-x-y}Sr_yMgAl_{10}O_{17}:Eu_x$, wherein $0.03 \leq x \leq 0.25$ and $0.1 \leq y \leq 0.5$, and containing at least one of Ti, Zr, Hf, Si, Ge, Sn, and Ce substituting for part of one of elements Al and Mg.

2. A blue phosphor excited by ultraviolet light to emit visible light, and made of one of crystal structures $Ba_{1-x}MgAl_{10}O_{17}:Eu_x$ and $Ba_{1-x-y}Sr_yMgAl_{10}O_{17}:Eu_x$, wherein $0.03 \leq x \leq 0.25$ and $0.1 \leq y \leq 0.25$ and wherein a quadrivalent element substitutes for one of elements Al and Mg constituting said phosphor.

3. The phosphor of claim 2, wherein said quadrivalent element is at least one of Ti, Zr, Hf, Si, Ge, Sn, and Ce.

4. The phosphor of claim 2, wherein a substitution value of said quadrivalent element with respect to one of elements Al and Mg ranges from 0.01 to 3.0%.

5. A method of manufacturing a phosphor comprising:
   a mixed solution fabrication step of mixing one of a metal salt and an organometallic salt containing elements constituting a blue phosphor comprising Ba, Mg, Al, Eu, Ti, Zr, Si, Ge, Sn and Ce and an aqueous media to fabricate a mixed solution; and
   a step of drying the mixed solution and thereafter firing a dried mixture in a reducing atmosphere to produce one of phosphors $Ba_{1-x}(Mg_{1-a}M_a)(Al_{1-b}M_b)Al_{10}O_{17}:Eu_x$ (wherein M and is one of Ti, Zr, Hf, Si, Ge, Sn and Ce, and wherein $0.03 \leq x \leq 0.25$, $0.1 \leq y \leq 0.5$, $a \leq 0.001$ and $b \leq 0.03$).

6. A method of manufacturing a phosphor represented by the formula $Ba_{1-x}MgAl_{10}O_{17}:Eu_x$, wherein $0.03 \leq x \leq 0.25$, comprising:
   mixing in an aqueous medium salts of Ba, Mg, Al and Eu to form a hydrate, said salts mixed in a molar ratio sufficient to provide said phosphor;
   subjecting the hydrate to a hydrothermal synthesis reaction at temperatures ranging from 100° to 350° C. under pressures ranging from 0.2 to 25 MPa to form the phosphor; and
   annealing the phosphor at temperatures ranging from 1,000 to 1,600° C. in an atmosphere containing nitrogen and hydrogen.

7. The method of claim 6, wherein 0.01 to 3% of elements Mg and Al in the phosphor can be substituted with one or more quadrivalent element selected from the group consisting of Ti, Zr, Hf, Si, Sn, Ge and Ce by adding a salt of said quadrivalent element to said aqueous medium.

8. A method of manufacturing a phosphor represented by the formula $Ba_{1-x-y}Sr_yMgAl_{10}O_{17}:Eu_x$, wherein $0.03 \leq x \leq 0.25$ and $0.1 \leq y \leq 0.5$, comprising:
   mixing in an aqueous medium salts of Ba, Sr, Mg, Al and Eu to form a hydrate, said salts mixed in a molar ratio sufficient to provide said phosphor;
   subjecting the hydrate to a hydrothermal synthesis reaction at temperatures ranging from 100° to 350° C. under pressures ranging from 0.2 to 25 MPa to form the phosphor; and
   annealing the phosphor at temperatures ranging from 1,000 to 1,600° C. in an atmosphere containing nitrogen and hydrogen.

9. The method of claim 8, wherein 0.01 to 3% of elements Mg and Al in the phosphor can be substituted with one or more quadrivalent element selected from the group consisting of Ti, Zr, Hf, Si, Sn, Ge and Ce by adding a salt of said quadrivalent element to said aqueous medium.

* * * * *